(12) United States Patent
Chiang

(10) Patent No.: US 7,634,190 B2
(45) Date of Patent: Dec. 15, 2009

(54) LENS MODULE WITH FOCUSING MECHANISM

(75) Inventor: Tsung-Wei Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 456 days.

(21) Appl. No.: 11/556,115

(22) Filed: Nov. 2, 2006

(65) Prior Publication Data

US 2007/0212050 A1 Sep. 13, 2007

(30) Foreign Application Priority Data

Mar. 10, 2006 (CN) .................. 2006 1 0034360

(51) Int. Cl.
G03B 13/32 (2006.01)
G03B 13/00 (2006.01)
G02B 7/04 (2006.01)
(52) U.S. Cl. .................. 396/144; 359/822; 359/823; 359/825; 348/345; 348/357
(58) Field of Classification Search .................. 396/72, 396/79–80, 82–83, 86, 87, 144–146; 359/694–701, 359/822–823, 825–826; 348/345, 357
See application file for complete search history.

(56) References Cited

U.S. PATENT DOCUMENTS

| 6,324,022 B1 * | 11/2001 | Yoshida | 359/823 |
| 2003/0214727 A1 * | 11/2003 | Min et al. | 359/696 |
| 2007/0242940 A1 * | 10/2007 | Yumiki et al. | 396/79 |

FOREIGN PATENT DOCUMENTS

CN          2665734 Y          12/2004

OTHER PUBLICATIONS 2004-024375, Abstract, Jan. 30, 2004.*
2004-024376, Abstract, Jan. 30, 2004.*

* cited by examiner

Primary Examiner—Bot L LeDynh
(74) Attorney, Agent, or Firm—Steven M. Reiss

(57) ABSTRACT

An exemplary lens module (20) includes a lens barrel (5), a focusing mechanism (7), a resilient member (9), and a bottom seat (6). The lens barrel is mounted with a lens (517) therein. The lens barrel is axially movable relative to the bottom seat due to a rotation of the focusing mechanism and the force generated by the resilient member. Such an axial movement, in turn, would change a position of the lens relative to the bottom seat.

14 Claims, 4 Drawing Sheets

LENS MODULE WITH FOCUSING MECHANISM

BACKGROUND OF THE INVENTION

1. Field of the Invention

The present invention generally relates to lens modules and, more particularly, to a lens module with a focusing mechanism configured (i.e., structured and arranged) for use in an optical device, such as a microscope, a camera module, a digital camera module used in a portable electronic device, or the like.

2. Description of Related Art

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera module. These electronic devices enable consumers to enjoy capturing digital pictures anytime and anywhere. At the same time, the desire/need for improved digital picture quality has become greater and greater.

In a typical camera module, a lens module is a very important element in producing high quality pictures. Generally, a camera module includes a lens module and an image sensing module. Optical image signals are focused by the lens module onto the image sensing module. The image sensing module transforms the optical image signals into electronic image signals. When a distance between the lens module and the image sensing module is adjusted, the definition of the optical image signals received by the image sensing module is also changed. Focusing mechanisms are widely used in camera modules (both digital and film-based) for creating high quality photos.

In a typical focusing mechanism-equipped lens module, the focusing mechanism generally includes some driving elements such as gearings and motors. When the lens module is used to take photos, the focusing mechanism moves optical components, such as the lens module and/or the image sensing module, to an appropriate position using the drivers. However, the structure of the focusing mechanism is often complicated and is likely to undergo wear and tear during long-term operation, and the precision of the focusing mechanism tends to be reduced as a result of such wear and tear.

Therefore, a new lens modules is desired in order to overcome the above-described shortcomings.

SUMMARY

In one embodiment thereof, a lens module includes a lens barrel, a focusing mechanism, and a bottom seat. The lens barrel includes at least one lens mounted therein. The focusing mechanism is configured for facilitating a selectable axially movement of the lens barrel and is rotatable relative to the lens barrel. The focusing mechanism is configured as a cam-linear mechanism. The lens barrel is axially movable relative to the bottom seat due to a rotation of the focusing mechanism, the rotation thereby facilitating a change in a position of the at least one lens relative to the bottom seat.

Other advantages and novel features of the embodiments will become more apparent from the following detailed description thereof when taken in conjunction with the accompanying drawings.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the lens module and its potential applications. Moreover, in the drawings, like reference numerals designate corresponding parts throughout the several views.

DETAILED DESCRIPTION OF THE EMBODIMENTS

Figure 1:
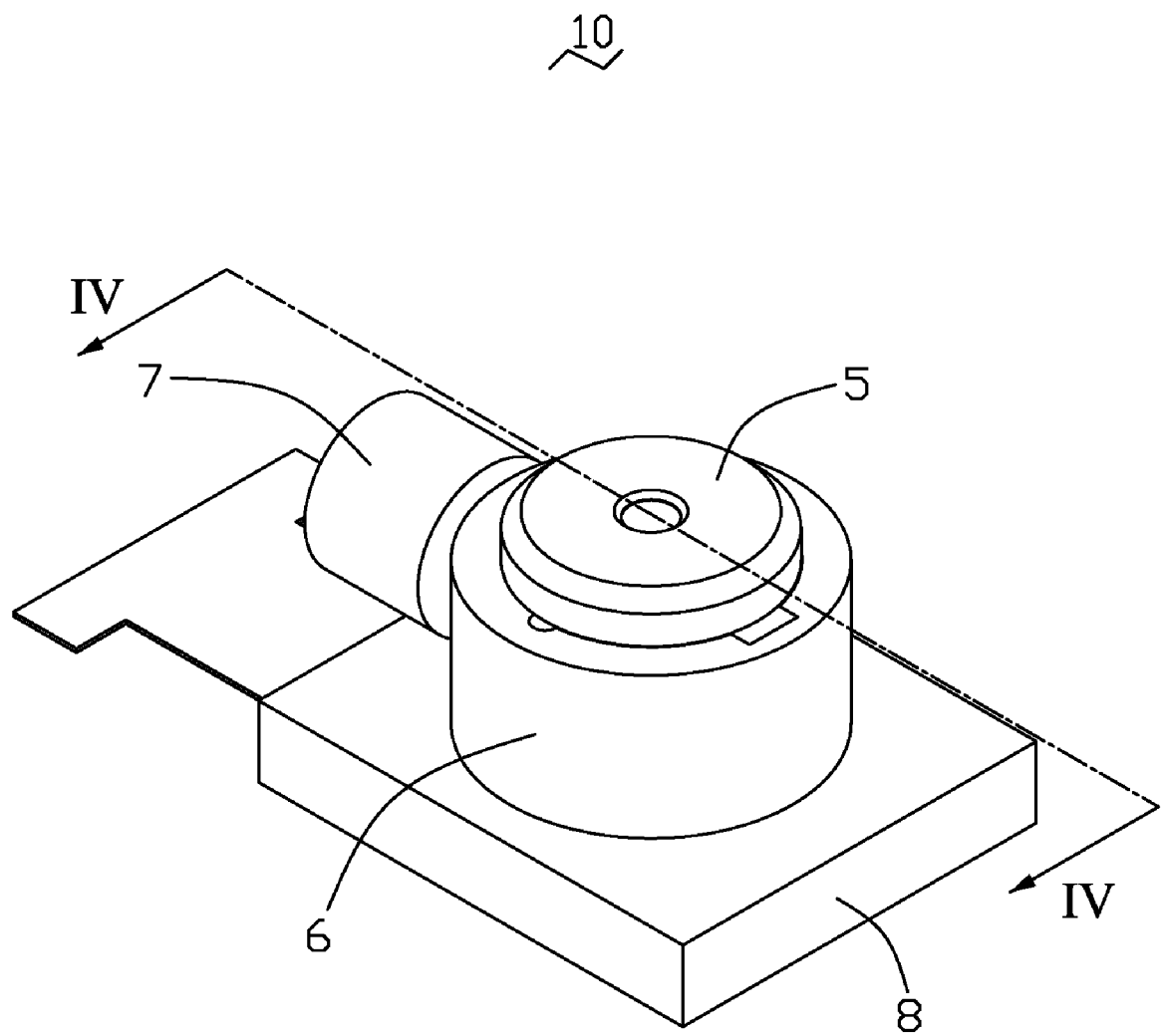
FIG. 1 is an assembled, isometric view of a camera module having a lens module with a focusing mechanism, in accordance with a preferred embodiment.

Referring now to the drawings in detail, FIG. 1 shows a camera module 10 of a preferred embodiment. The camera module 10 includes a lens module 20 with focusing mechanism and an image sensing module 8. The lens module 20, in the illustrated embodiment, is used to concentrate image light traveling incident to the lens module 20 onto the image sensing module 8 to capture an image. While the lens module 20 is shown incorporated into the camera module 10, it is to be understood that the lens module 20 or obvious variations thereof may prove useful in other work environments (e.g., in microscopes).

Figure 2:
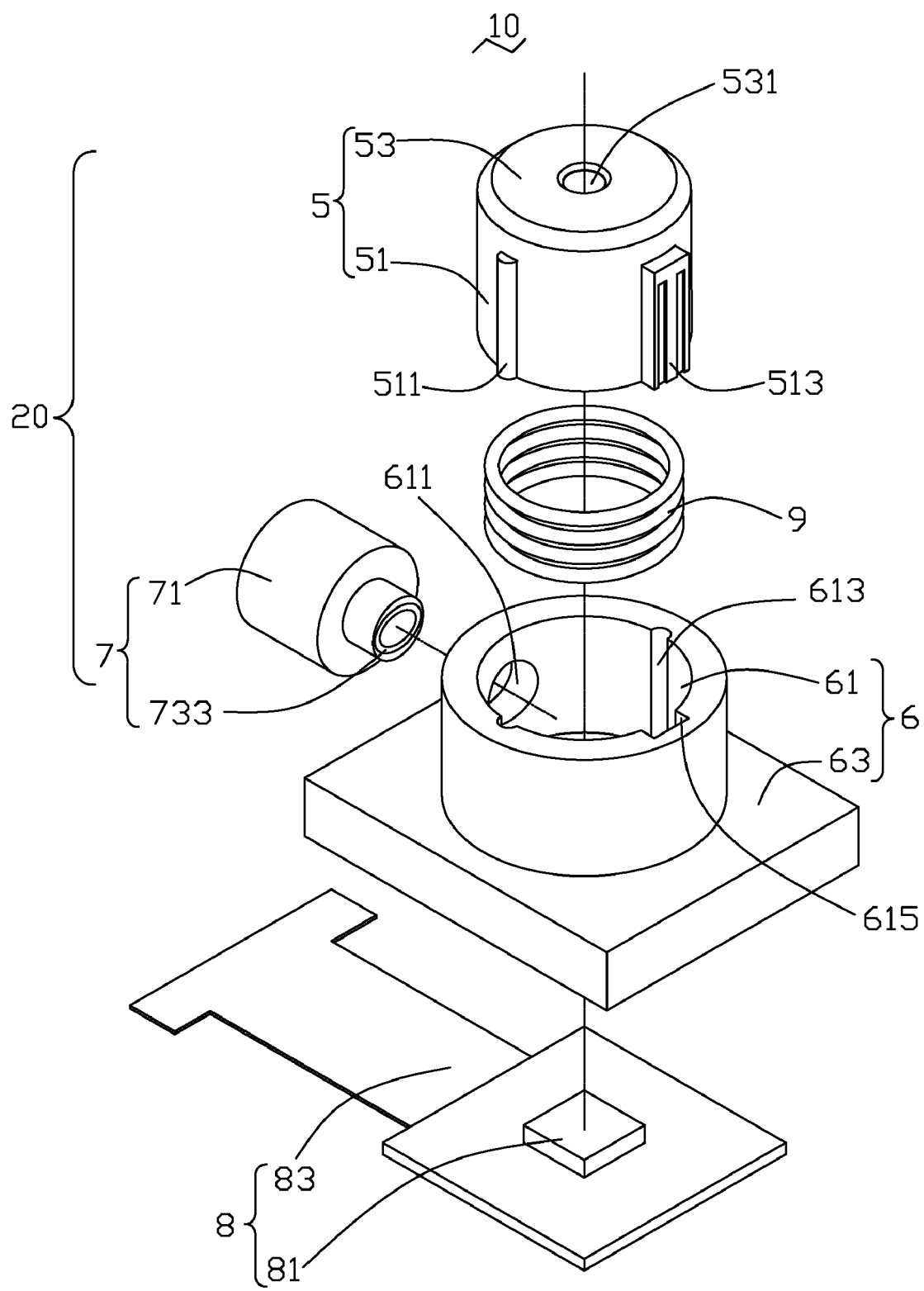
FIG. 2 is an exploded, isometric view of the camera module in FIG. 1.

Also further referring to FIG. 2 as well as FIG. 1, the lens module 20 includes a lens barrel 5, a bottom seat 6, a focusing mechanism 7, and a resilient member 9. The lens barrel 5 is movably mounted in the bottom seat 6. The focusing mechanism 7 is mounted in the bottom seat 6 and engages with the lens barrel 5.

Figure 3:
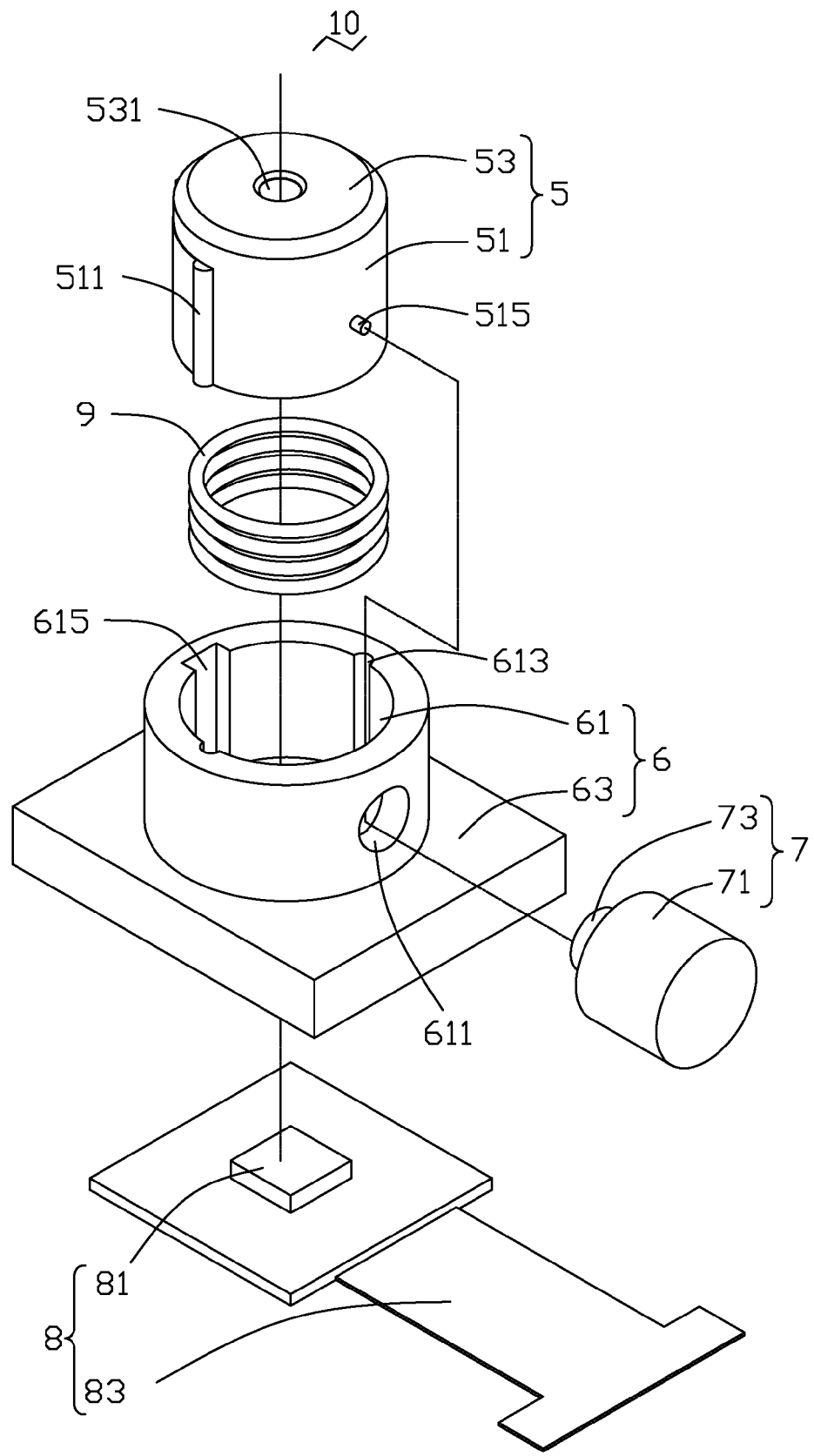
FIG. 3 is similar to FIG. 2 but viewed from another aspect.
Figure 4:
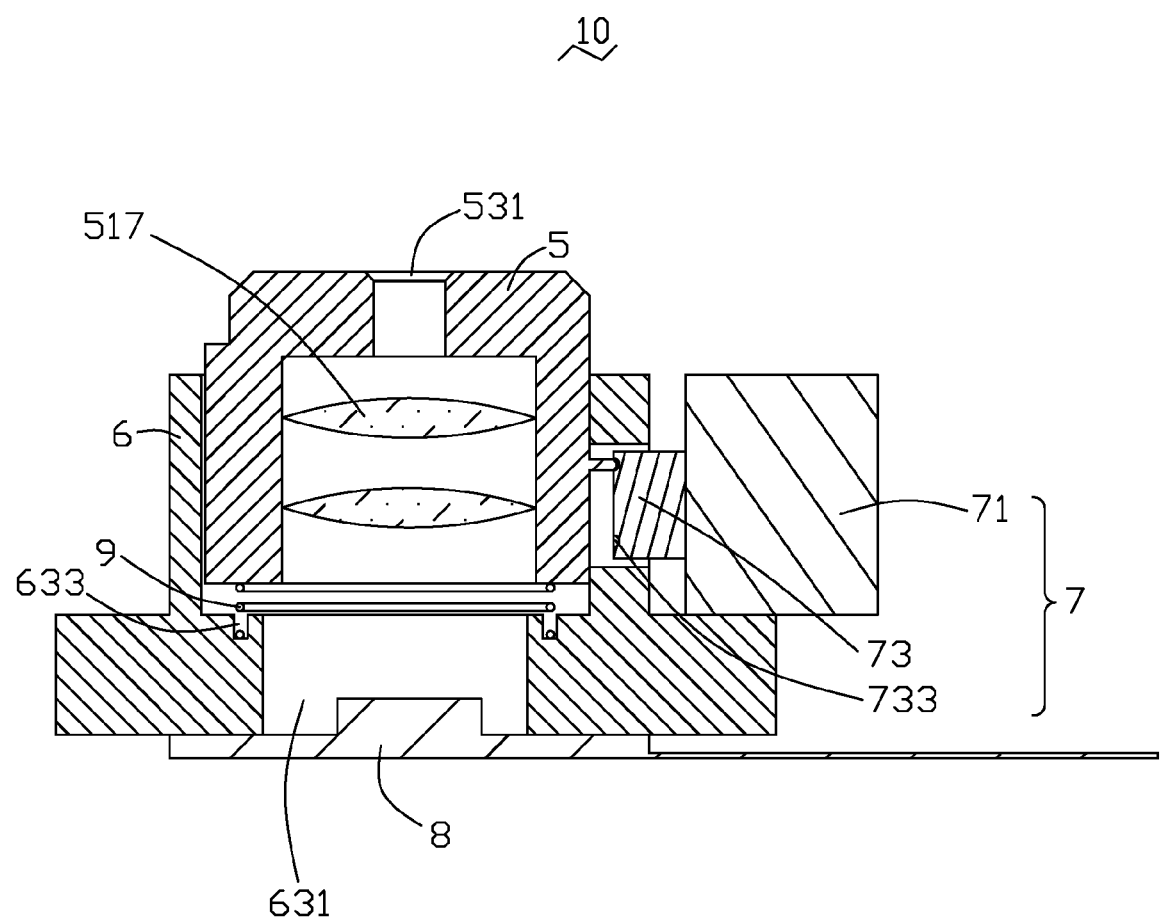
FIG. 4 is a cross-sectional view along line IV-IV in FIG. 1.

Additionally referring to FIGS. 3-4, the lens barrel 5 has a substantially cylindrical body 51 and a cover 53. The cover 53 is mounted to one end of the body 51 and defines an opening 531 in a center thereof. The opening 531 is configured for allowing image light to travel therethrough. A plurality of lenses 517 is advantageously mounted in the body 51 for concentrating image light onto the image sensing module 8, although it is understood that a simple one-lens unit could be employed and be within the scope of the present lens module. A pair of guiding rails 511 is formed on a periphery of the body 51 and extends along an axial direction of the body 51. The two guiding rails 511 are separated from each other by an angle of about 180 degrees. A displacement measuring module 513 is formed directly on the periphery of the body 51 and is located between the two guiding rails 511. A pin 515 is formed on the periphery of the body 51, in contact therewith, and faces away from the displacement measuring module 513.

The bottom seat 6 includes a lens seat 61 and a bottom board 63. The lens seat 61 is substantially cylindrical in shape. An inner diameter of the lens seat 61 is substantially equal to an outer diameter of the body 51 of the lens barrel 5 so that the lens barrel 5 can be movable in the lens seat 61 while ensuring the alignment of the lens barrel 5 relative thereto. A side hole 611 is defined through the lens seat 61. A pair of guiding grooves 613 is defined in an inner wall of the lens seat 61. The guiding grooves 613 are configured for movably receiving the guiding rails 511 of the lens barrel 51 so that the lens barrel 5 can be essentially only axially movable (i.e., limited to a single degree of freedom) relative to the lens seat 61. The bottom board 63 is mounted to and, thereby, adjacent the image sensing module 8.

A receiving groove 615 is further defined directly in the inner wall of the lens seat 61 and between the two guiding grooves 613. The receiving groove 615 is configured for receiving the displacement measuring module 513 therewithin, allowing the displacement measuring module 513 to measure the displacement between the lens barrel 5 and the lens seat 61. It is noted that the interaction of the receiving groove 615 and the displacement measuring module 513 also serves to axially limit the movement of the lens barrel 5 relative to the lens seat 61.

The lens seat 61 is mounted on the bottom board 63. The bottom board 63 is rectangular in shape and defines a through hole 631 through a center thereof. A circular receiving slot 633 is defined directly in a top portion of the bottom board 63 and around the through hole 631. It is because of the through hole 631 and opening 531 that light is able to travel through the lenses 517 and to reach the image sensing module 8.

The focusing mechanism 7 includes a motor 71 and a driving pole 73. The motor 71 can, for example, be a step motor or any other motor facilitating highly controlled motion. The driving pole 73 can be rotated by use of the motor 71. A cam slot 733 is defined in one end of the driving pole 73, the cam slot 733 advantageously being elliptical. However, it is to be understood that other cam slot shapes could be chosen to permit for more complex focusing abilities. The driving pole 73 is configured for receipt in the side hole 611 of the lens seat 61.

The resilient member 9 is advantageously made of metal or, potentially, a resilient polymer and is advantageously spiral-shaped (i.e., a coil spring). A diameter of the resilient member 9 is larger than an inner diameter of the lens barrel 5 and less than or equal to the inner diameter of the lens seat 61. One end of the resilient member 9 is configured/sized to be fittingly received in the receiving slot 633.

The image sensing module 8 includes a flexible circuit board 83 and an image sensor member 81. The flexible circuit board 83 is electrically connected to the image sensor member 81. The image sensor member 81 is configured for receipt in the through hole 631 of the bottom board 63. The image sensor member 81 transforms image light signals into electronic signals.

In assembly, the set of lenses 517 is mounted in the body 51 of the lens barrel 5. One end of the resilient member 9 is placed in the receiving slot 633 of the bottom board 63. The lens barrel 5 is mounted in the lens seat 61 and on the other opposite end of the resilient member 9. The guiding rails 511 of the lens barrel 51 engage in the guiding grooves 613 of the lens seat 61. The displacement measuring module 513 is received in receiving groove 615 of the lens seat 61. The focusing mechanism 7 is mounted to the bottom seat 6. The driving pole 73 is received in the side hole 611 of the lens seat 61. The pin 515 is received in the slot 733 of the driving pole 73. The image sensor member 81 of image sensing module 8 is received in the through hole 631 of the bottom board 63. Thus, the camera module 10 is completely assembled, as represented in FIGS. 1 and 4.

In use, when camera module 10 is used to take photos of objects, the motor 71 of the focusing mechanism 7 is operated to drive the driving pole 73 to rotate. The rotation of the driving pole 73 and the force generated by the resilient member 9 results in axial movement of the pin 515 and the lens barrel 5, relative to the lens seat 61. Specifically, the driving pole 73 and the pin 515 together essentially act as a cam-linear linkage, with the resilient member 9 always pushing the pin 515 to its highest point of travel possible within the interior of the driving pole 73. The highest point of travel depends essentially solely on the angle of displacement of the driving pole 73 (as controlled by the motor 71), since the pin 515 itself cannot move angularly (i.e., the lens barrel 5 being limited solely to axial movement). The displacement measuring module 513 measures the displacement between the lens barrel 5 and the lens seat 61 and transfers the displacement information to the motor 71 or a user. When the lens barrel 5 is located in a desired position, the motor 71 is stopped.

It is to be understood that the resilient member 9 may alternatively be made of another material (e.g., plastic or rubber). The resilient member 9 may also have a different configuration, for example, a leaf spring or a resilient cylinder. The receiving slot 633 may be omitted and the resilient member 9 may be mounted (e.g., via an adhesive or a solder) on the bottom board 63. The resilient member 9 may be omitted. Alternatively, the guiding rails may be formed on the inner wall of the lens seat 61, and, accordingly, the guiding grooves may be defined in the lens barrel 5.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module comprising:
   a lens barrel mounted with at least one lens therein;
   a focusing mechanism configured for facilitating a selectable axial movement of the lens barrel, the focusing mechanism being configured as a cam-linear mechanism, the focusing mechanism being rotatable relative to the lens barrel;
   a bottom seat, the lens barrel being axially movable relative to the bottom seat due to a rotation of the focusing mechanism, the rotation thereby facilitating a change in a position of the at least one lens relative to the bottom seat; and
   a resilient member, wherein one end of the resilient member resists the bottom seat and the other opposite end of the resilient member resists the lens barrel.

2. The lens module as claimed in claim 1, wherein the lens barrel further includes a pin, the focusing mechanism includes a driving pole, and the driving pole defines a slot therein configured for receiving the pin, the pin and the slot of the driving pole together acting as the cam-linear mechanism.

3. The lens module as claimed in claim 2, wherein the lens barrel is axially slidable relative to the bottom seat.

4. The lens module as claimed in claim 3, wherein a guiding rail is formed on one of the lens barrel and the bottom seat and a guiding groove is defined in the other of the lens barrel and the bottom seat so that the lens barrel is thereby axially movable relative to the bottom seat.

5. The lens module as claimed in claim 2, wherein the lens barrel includes a displacement measuring module for measuring a displacement between the lens barrel and the bottom seat.

6. The lens module as claimed in claim 2, wherein the slot is elliptical in shape.

7. The lens module as claimed in claim 2, wherein the bottom seat defines a side hole configured for receiving the driving pole of the focusing mechanism.

8. A camera module comprising:
- a lens barrel mounted with at least one lens therein;
- a focusing mechanism configured for facilitating a selectable axial movement of the lens barrel, the focusing mechanism being configured as a cam-linear mechanism, the focusing mechanism being rotatable relative to the lens barrel;
- a bottom seat, the lens barrel being partially mounted in the bottom seat, the focusing mechanism being mounted to the bottom seat;
- a resilient member, wherein one end of the resilient member resists the bottom seat and the other opposite end of the resilient member resists the lens barrel; and
- an image sensing module being mounted to the bottom seat, the lens barrel being axially movable relative to the bottom seat due to a rotation of the focusing mechanism, the rotation thereby facilitating a change in a position of the at least one lens relative to the image sensing module.

9. The lens module as claimed in claim 8, wherein the lens barrel is axially slidable relative to the bottom seat.

10. The camera module as claimed in claim 9, wherein a guiding rail is formed on one of the lens barrel and the bottom seat and a guiding groove is defined in the other of the lens barrel and the bottom seat so that the lens barrel is thereby axially movable relative to the bottom seat.

11. The camera module as claimed in claim 8, wherein the lens barrel includes a displacement measuring module for measuring a displacement between the lens barrel and the bottom seat.

12. The lens module as claimed in claim 8, wherein the lens barrel farther includes a pin, the focusing mechanism includes a driving pole, and the driving pole defines a slot therein configured for receiving the pin, the pin and the slot of the driving pole together acting as the cam-linear mechanism.

13. The camera module as claimed in claim 12 wherein the slot is elliptical in shape.

14. The camera module as claimed in claim 12, wherein the bottom seat defines a side hole for receiving the driving pole of the focusing mechanism.

* * * * *

UNITED STATES PATENT AND TRADEMARK OFFICE
CERTIFICATE OF CORRECTION

PATENT NO.      : 7,634,190 B2
APPLICATION NO. : 11/556115
DATED           : December 15, 2009
INVENTOR(S)     : Tsung-Wei Chiang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Ninth Day of November, 2010

David J. Kappos
*Director of the United States Patent and Trademark Office*